US011835121B2

(12) United States Patent
James et al.

(10) Patent No.: US 11,835,121 B2
(45) Date of Patent: Dec. 5, 2023

(54) ENCAPSULATED GEAR TRAIN FOR A MACHINE

(71) Applicant: ROMAX TECHNOLOGY LIMITED, Cobham (GB)

(72) Inventors: Barry James, Cobham (GB); Ahmad Riza Jamaluddin, Cobham (GB); David Scott, Cobham (GB)

(73) Assignee: ROMAX TECHNOLOGY LIMITED, Cobham (GB)

( * ) Notice: Subject to any disclaimer, the term of this patent is extended or adjusted under 35 U.S.C. 154(b) by 0 days.

(21) Appl. No.: 17/827,567

(22) Filed: May 27, 2022

(65) Prior Publication Data
US 2022/0381331 A1    Dec. 1, 2022

(30) Foreign Application Priority Data

May 27, 2021    (EP) .................................... 21176295

(51) Int. Cl.
*F16H 57/025*    (2012.01)
*F16H 57/04*    (2010.01)
*F16H 57/02*    (2012.01)

(52) U.S. Cl.
CPC ....... *F16H 57/025* (2013.01); *F16H 57/0423* (2013.01); *F16H 2057/02034* (2013.01); *F16H 2057/02043* (2013.01)

(58) Field of Classification Search
CPC .. F16H 57/025; F16H 57/0423; F16H 57/032; F16H 57/03; F16H 2057/02034; F16H 2057/02043; F16H 2057/02017
See application file for complete search history.

(56) References Cited

U.S. PATENT DOCUMENTS

| 3,246,538 | A | * | 4/1966 | Easton | ..................... F16H 1/20 74/606 R |
| 4,122,730 | A | | 10/1978 | Weiland | |
| 5,827,148 | A | | 10/1998 | Seto et al. | |

(Continued)

FOREIGN PATENT DOCUMENTS

DE    112014003796 T5    5/2016
EP        0928713 B1    3/2003
(Continued)

OTHER PUBLICATIONS

USPTO Machine Translation (retrieved by FIT database) of the Description of FR 3075910 A3, Chalu et al., Jun. 28, 2019. (Year: 2022).*

(Continued)

*Primary Examiner* — Daniel D Yabut
(74) *Attorney, Agent, or Firm* — Maschoff Brennan

(57)    ABSTRACT

An encapsulated gear train gear train for a machine comprising a support frame, which is non-encasing, an input shaft rotatably mounted in the support frame, an output shaft rotatably mounted in the support frame, gears configured to operatively connect the input shaft with the output shaft, and an encasement configured to encapsulate the input shaft, the output shaft, the gears, and at least a portion of the support frame, wherein the support frame is configured to be mounted on a structure of the machine such that the support frame does not apply any loads onto the encasement.

17 Claims, 4 Drawing Sheets

(56) References Cited

U.S. PATENT DOCUMENTS

| | | | | |
|---|---|---|---|---|
| 6,059,684 A | * | 5/2000 | Sasaki | B60K 1/00 |
| | | | | 180/65.6 |
| 2019/0368595 A1 | * | 12/2019 | Liou | F04D 29/4226 |
| 2021/0396306 A1 | * | 12/2021 | Bronner | F16H 57/021 |

FOREIGN PATENT DOCUMENTS

| | | | | |
|---|---|---|---|---|
| FR | 2345634 A1 | | 10/1977 | |
| FR | 3075910 A3 | * | 6/2019 | |
| FR | 3075910 A3 | | 6/2019 | |
| GB | 1571074 A | * | 7/1980 | B64D 35/00 |
| GB | 2561804 A | | 10/2018 | |
| WO | WO-2015151609 A1 | * | 10/2015 | F16H 57/021 |

OTHER PUBLICATIONS

European Search Report dated Sep. 21, 2021 as received in application No. 21176295.

* cited by examiner

Fig. 9
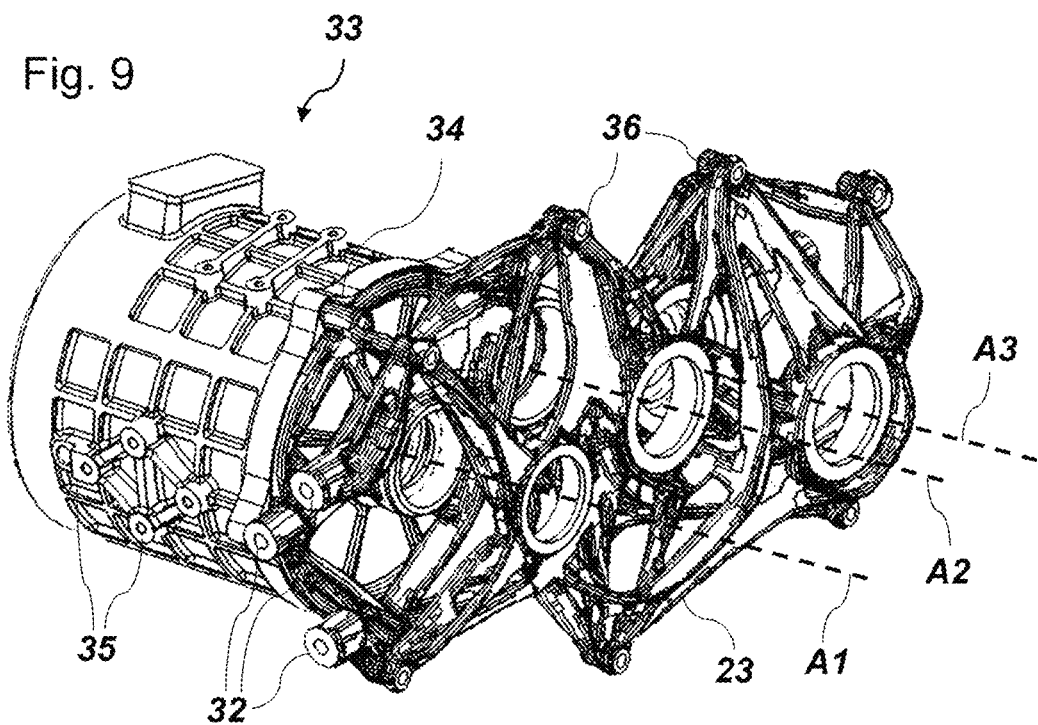
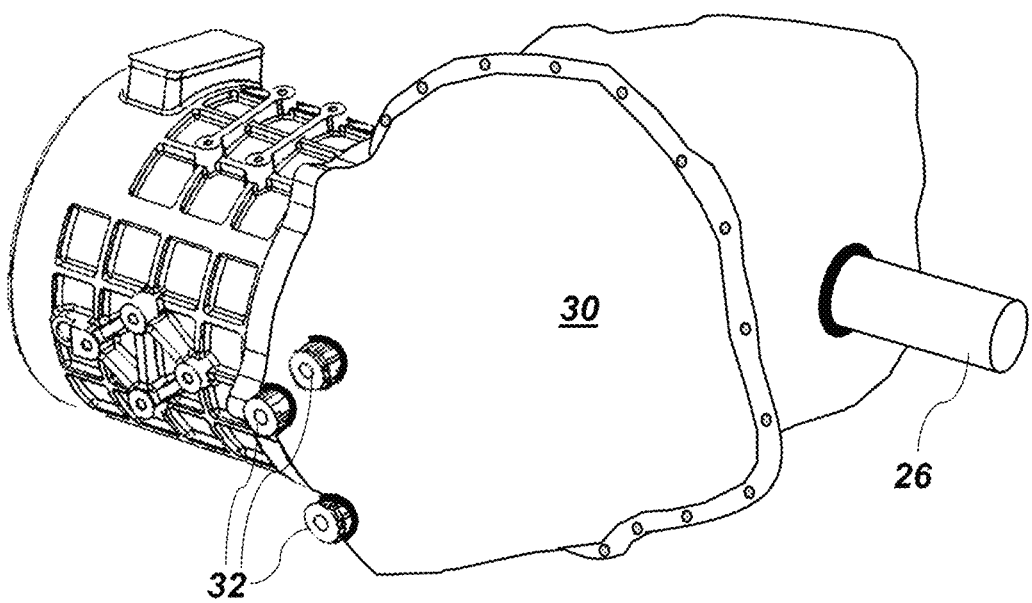
Fig. 10

ENCAPSULATED GEAR TRAIN FOR A MACHINE

FIELD

The present disclosure relates to an encapsulated gear train for a machine, in particular for a vehicle, aircraft, ship, train, tractor, or wind turbine.

BACKGROUND

Gear trains according to the state of the art as used in transmissions, gearboxes, axles, differentials, steering gears, or power take offs have housings (also known as casings) that combine the function of mounting and supporting the moving parts and the function of encapsulating the moving parts in one structure. That is, a housing not only performs the job of encapsulation with a continuous skin, but it also carries out the structural tasks. This principle is usually adopted by any system in which rotating gears transmit mechanical power or positional definition.

One drawback of such a construction is that this continuous skin encapsulates the entire transmission and thus provides a large surface that is very efficient at noise radiation. Since it is also a structural part, this same housing is subjected to vibrations that may be caused by the gears due to transmission error, leading to the generation of airborne vibration.

A further drawback relates to the freedoms of how the transmission can be designed. Since both functions, support and encapsulation, usually come with restrictions of their own kind, the designer is required to find some compromise.

SUMMARY

Therefore, the present disclosure provides an improved gear train. The disclosure allows for the provision of a stiffer, more robust, lighter, and quieter gear train.

This is achieved by a constructional separation of the function of structural support and the function of encapsulation of the gear train.

The disclosure relates to an encapsulated gear train for a machine comprising a support frame, which is non-encasing, an input shaft rotatably mounted in the support frame, an output shaft rotatably mounted in the support frame, gears configured to operatively connect the input shaft with the output shaft, and an encasement configured to encapsulate the input shaft, the output shaft, the gears, and at least a portion of the support frame, wherein the support frame is configured to be mounted on a structure of the machine such that the support frame does not apply any loads onto the encasement.

In some embodiments, the encasement is, in terms of substance, a separate item from the support frame.

In some embodiments, the support frame comprises a fixing point protruding from a main body of the support frame, and the support frame is configured to be mounted on the structure by the fixing point.

In some embodiments, the encasement is configured to encompass the fixing point and to seal the encapsulated components.

In some embodiments, a vibration isolating seal is arranged between the encasement and the fixing point.

In some embodiments, the encasement is, at least for the most part, made of a non-metal material.

In some embodiments, the gear train further comprises a lubricant distribution system configured to distribute lubricant inside the encasement.

In some embodiments, at least one of (a) an interior of the encasement, (b) the support frame, and (c) a lubricant guiding element arranged on the encasement or the support frame is part of the lubricant distribution system and configured to guide the lubricant towards at least one of (i) the gears and (ii) bearings, the gears and bearings being mounted on the input shaft or the output shaft which are rotatably mounted in the support frame.

In some embodiments, the encasement is configured to encapsulate the whole support frame and to further encapsulate a portion of the structure.

In some embodiments, the support frame is produced by at least one of casting, sintering, forging, machining, moulding, or additive manufacturing.

In some embodiments, the support frame is designed based only or mainly on mechanical requirements.

In some embodiments, the gear train further comprises a locating element arranged between the encasement and the support frame.

In some embodiments, the gear train further comprises an air ventilation system with an air inlet, an air outlet, and an air accelerator, wherein the air inlet and the air outlet are arranged on the encasement.

In some embodiments, the machine is a vehicle, an aircraft, a ship, a train, or a wind turbine. In particular, the vehicle is an electric vehicle.

In some embodiments, the encapsulated gear train is a single-speed two-stage transmission. In particular, the machine is an electric vehicle and the encapsulated gear train is a single-speed two-stage transmission.

In some embodiments, the support frame is mounted to a gas turbine, an electric motor, an engine, or a generator The disclosure further relates to an electric powertrain comprising a gear train according to the disclosure herein and an electric motor, wherein the encasement is configured to further encapsulate the electric motor.

BRIEF DESCRIPTION OF THE DRAWINGS

By way of example only, preferred embodiments will be described more fully hereinafter with reference to the accompanying figures, wherein:

FIG. 9 shows a support frame in accordance with an embodiment with a motor;

FIG. 10 shows the support frame and motor from FIG. 9 with an encapsulating encasement.

DETAILED DESCRIPTION

Figure 1:
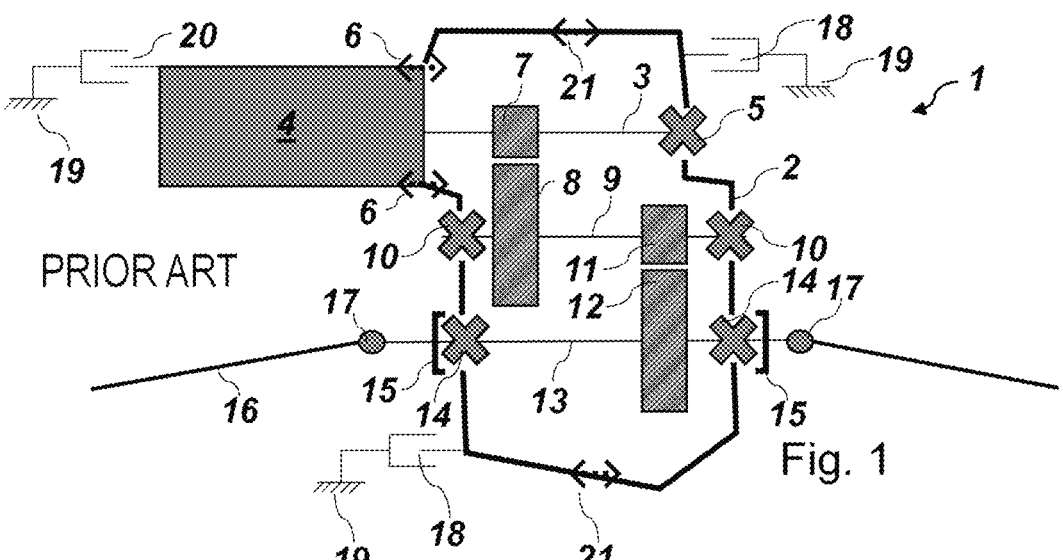
FIG. 1 shows a gearbox according to the state of the art.
Figure 4:
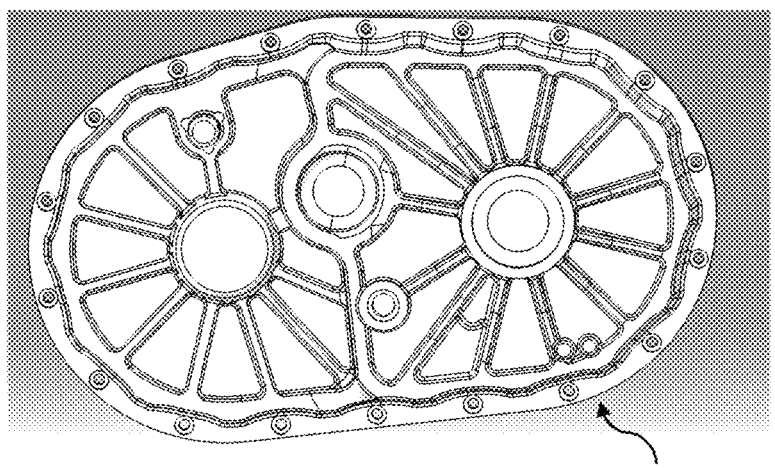
FIG. 4 shows a housing of a transmission according to the state of the art.

FIG. 1 shows a gear train 1, in particular a gear box or transmission, according to the state of the art, having a housing 2 that combines in itself the structure for mounting the transmission shafts and the encapsulation to seal up the transmission gears. By mounting this comprises providing structural support against loads such as gravity and separating forces generated by the gears when power is passed through a meshing gear pair. By encapsulation this comprises containing the lubricant within the transmission and preventing ingress of dust, dirt and water. Such a typical transmission housing is also shown in FIG. 4.

Further with reference to FIG. 1, the input shaft 3 driven by the motor 4 is mounted in the housing 2 and is supported with a bearing 5. Of course, the motor 4 could have a rotor shaft that is directly fixed to the input shaft 3, but for the sake of simplicity it is shown as one shaft here.

In this example, the motor 4 and the housing 2 are connected by bolted joints 6. The gear 7 arranged on the input shaft 3 drives the gear 8 arranged on the intermediary shaft 9 to achieve a first reduction. The intermediary shaft 9 is mounted in the housing 2 by the bearings 10. A further gear 11 is arranged on the intermediary shaft 9 to drive the gear 12 arranged on the output shaft 13 to achieve a second reduction. The output shaft 13 is mounted in the housing 2 by the bearings 14. Seals 15 prevent particles (e.g. dust, dirt, or water) from entering the housing 2 and lubricant to leave the housing 2 at the point at which the output shaft transmits power out of the transmission. The output shaft 13 drives the drive shafts 16 via universal joints 17.

The gears 7, 8, 11, 12 and shafts 3, 9, 13 are subject to gravitational loading. Additionally, as power is transmitted through the meshing gears the gears force themselves apart. These gravitational forces and gear loads are passed through the bearings 5, 10, 14, into the housing 2 and through mounts 18 to the structure 19. This can be described as the load path. The motor 4 is mounted on the chassis 19 with another isolating mount 20. The housing 2 consists of two halves that are connected by bolted joints 21. Lubricant that is needed for reducing friction and wear and removing heat from the rolling/sliding contacts of the gears is kept inside the system because the housing 2 assumes—in addition to the function of structural support—the encapsulation function that also prevents the ingress of dust, dirt and water.

Figure 2:
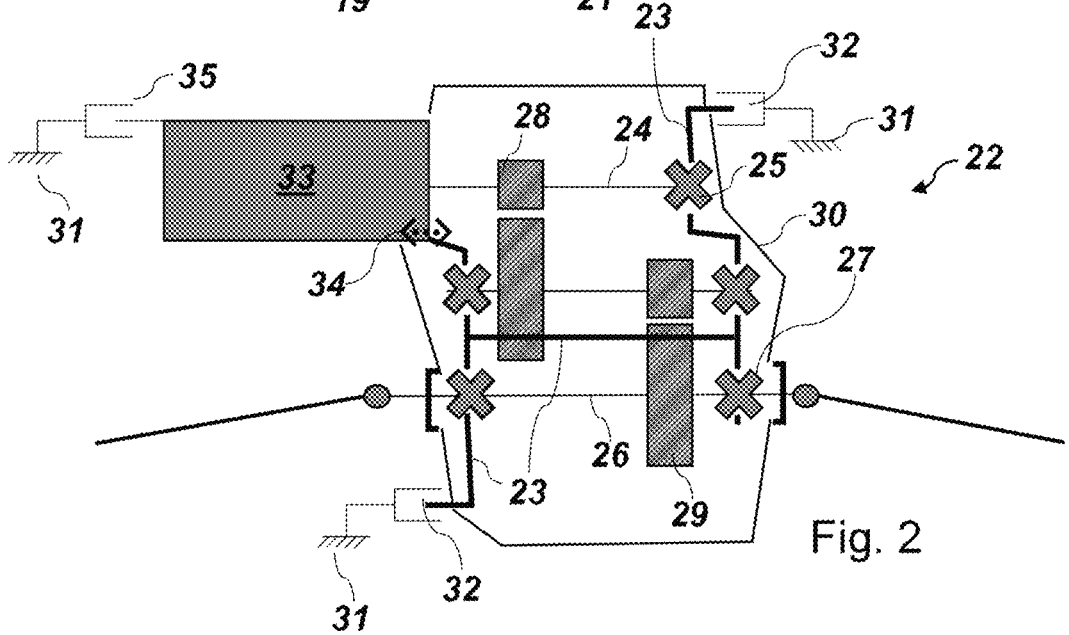
FIG. 2 shows a gearbox as an embodiment.

FIG. 2 shows a gear train 22 for a machine as an example embodiment. Specifically, the gear train 22 is a transmission comprising a non-encasing support frame 23, which is indicated as the bold-lined structure. "Non-encasing" means open so that the shafts and gears are not sealed by the support frame. Oil is able to pass through the support frame and no protection is provided by the frame from dust, dirt or water. An input shaft 24 is rotatably mounted in the support frame 23 by bearing 25, and an output shaft 26 is rotatably mounted in the support frame 23 by bearings 27. An optional intermediary shaft can be provided as in FIG. 1. Gears 28 and 29 (and the optional gears on the intermediary shaft) are provided to operatively connect the input shaft 24 with the output shaft 26. An encasement 30 encapsulates the input shaft 24, the output shaft 26, the gears 28 and 29, and at least a portion of the support frame 23. The support frame 23 is immediately mounted on the structure 31 of the machine such that the support frame 23 does not pass any structural loads on to the encasement 30. For example, the support frame 23 is mounted via isolating mounts 32 (=fixing point) and 35 on the structure 31.

The shown configuration is one example of how the support frame can be mounted on a structure of the machine, i.e. in this embodiment, the structure is in part the chassis 31 and in part the motor 33, and the machine may be a vehicle. In further embodiments, the structure may be only the chassis or only the motor or any other part of a vehicle, tractor, aircraft, train, ship, or wind turbine.

Thus, an important difference between the inventive transmission and the prior art is that the encapsulating part (for example, the prior art includes a housing, and some aspects of the present disclosure include an encasement) is not in the load path between the shafts and gears and the structure. In accordance with some embodiments, the encapsulating part is resting totally on the shaft support frame and is isolated from it by anti-vibration elements. The encapsulating part (=encasement) has thus merely or mostly the function of (a) keeping the lubricant within its dimensions, i.e. inside its interior where the moving parts (shafts, gears) are located as well as (b) preventing of dust, dirt and water ingress. The encasement is not affected by gravitational forces or gear loads coming from the support frame.

The support frame 23 may be attached to the motor 33 by at least one bolted joint 34, and the motor 33 may be mounted on the structure 31 by isolating mount 35. The mounts 32 and 35 provide freedom of movement between the transmission and the structure. The structural loads (flex due to torque applications, temperature changes, external shock loads) pass through these mounts, and since the mounts are provided with a degree of flexibility, the gearbox moves relative to the environment/vehicle.

Figure 3:
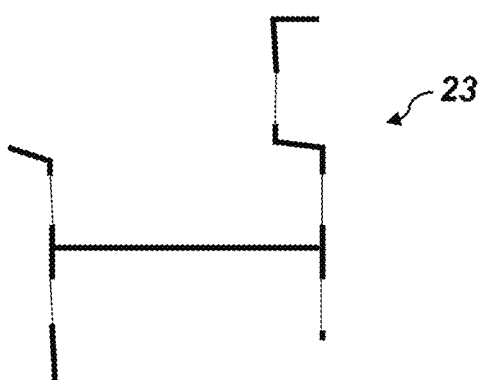
FIG. 3 shows only the support frame from FIG. 2.

FIG. 3 shows the support frame 23 isolated from all other components of the transmission 22. Because the support frame 23 can transfer all the load caused by the weight of the shafts and gears and by operating the transmission (gear loads) into the structure 31, the encasement 30 can be configured to carry nothing but its own weight. Thus, the encasement 30 can be manufactured from a light-weight material and be optimized for size and/or shape. In particular, plastic is lightweight and has excellent acoustic damping properties compared to cast iron, aluminium, or magnesium, which are the metals that state of the art transmission housings are usually made from.

Figure 5:
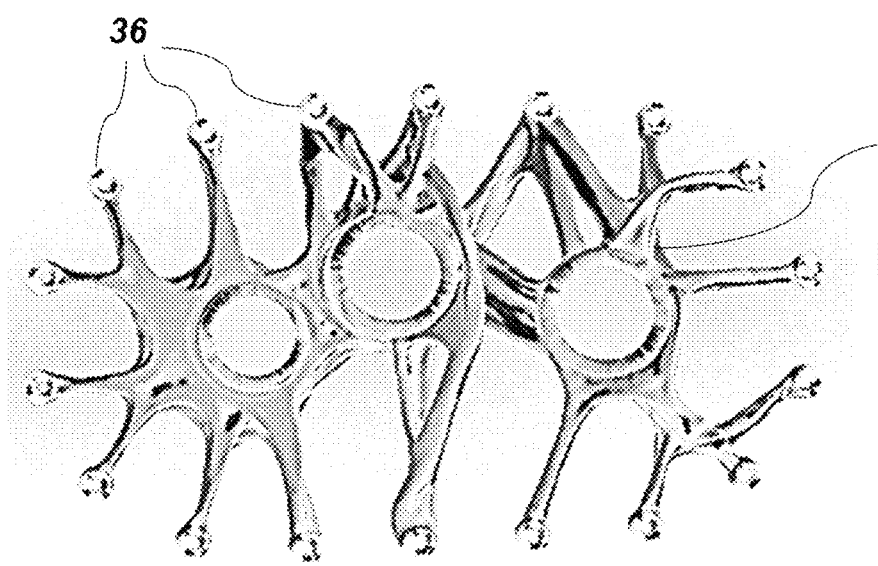
FIGS. 5 and 6 show support frames in accordance with an embodiment.

The support frame 23 on the other hand can be designed to have optimized strength and/or stability while omitting material that does not contribute to the strength. Therefore, such aspects allow for a lighter and more stable construction that is, in particular, based on mechanical (static, dynamic, and fatigue) requirements. A first iteration of such optimization can be seen by stepping from FIG. 4 (which shows a part of a conventional transmission housing that combines the structural support and the encapsulation of the shafts and gears) to FIG. 5 (which is the support frame 23). The support frames shown in FIGS. 5 and 6 correspond to the same gear train arrangement as does the housing shown in FIG. 4. For example, the static and dynamic loads that the structure will be exposed to can be determined with a simulation algorithm such as finite element analysis. When generating a 3D model of the optimized support frame structure, further restrictions can be taken into account such as the mounting spots (for attaching the support frame to the structure) or the joint spots 36 that are used to connect further parts of the support frame.

Figure 6:
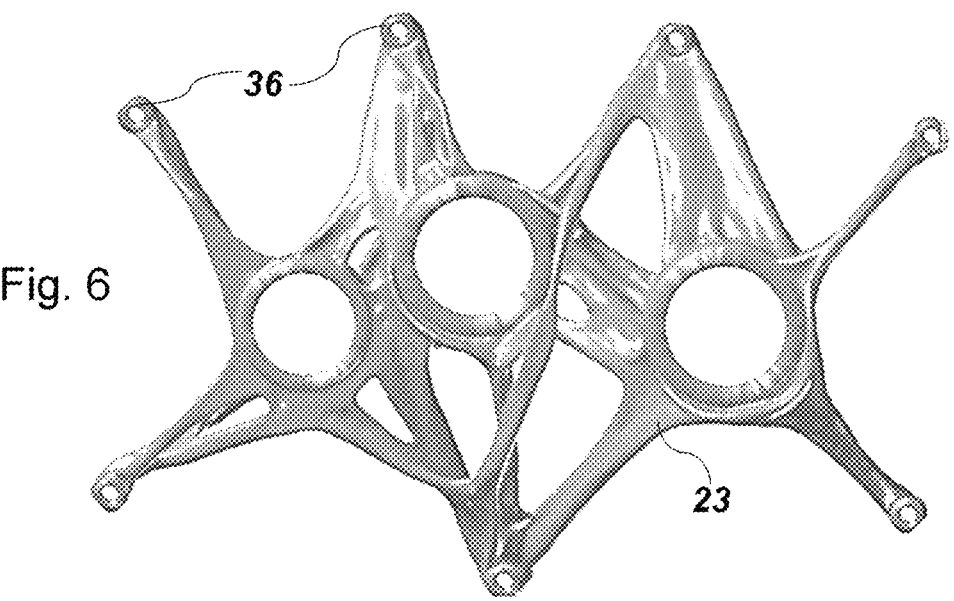

In a further iteration, the structure of the support frame can be further simplified, especially when, as shown in the example of FIG. 6, determining that the amount and position of the joint spots is free to be chosen by the simulation algorithm. The optimized support frame assumes what resembles an "organic" shape which may be difficult to manufacture with conventional production methods. Therefore, in an embodiment, the support frame may be produced by additive manufacturing. Casting and sintering may be alternatives to this manufacturing method and, when altering the optimized support frame to suit the method, even forging may be an option. These named manufacturing methods require very little finishing processes (optimally, only machining the bearing seats and bolting surfaces). Another manufacturing method allowing to use the full potential of the inventive construction is moulding composite materials, e.g. fibre-reinforced plastic. The different manufacturing methods can also be combined to form a hybrid system, whereby e.g. some parts of the support frame are made by forging and machining and then additive manufactured structure is added. Other combinations of the aforementioned manufacturing methods may apply as well.

The separation of the two functions (structural support and encapsulation) further effects a separation of noise abatement, i.e. abatement of air borne noise being assigned to the encapsulation function (encasement) and abatement of structure borne noise being assigned to the structural support function (support frame).

Figure 7:
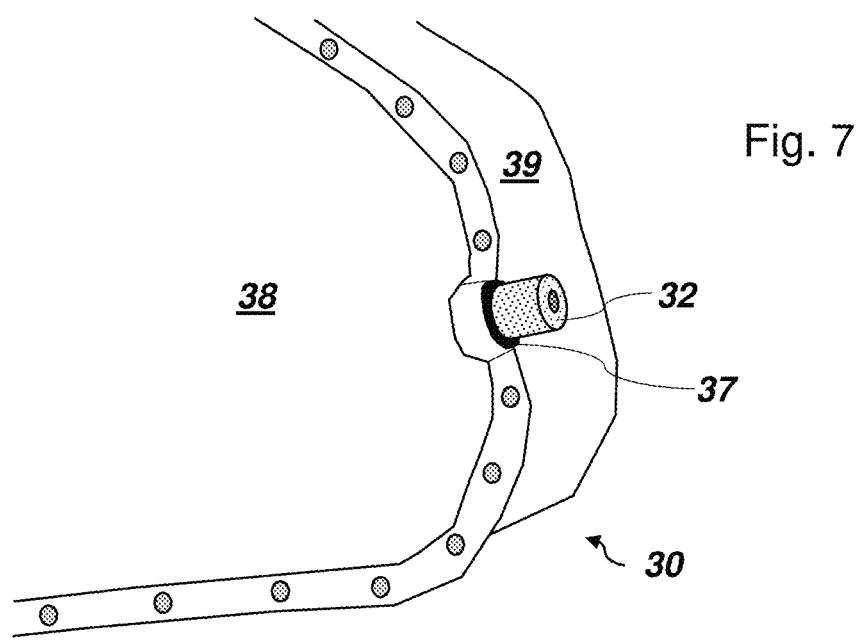
FIGS. 7 and 8 show transmissions in accordance with certain embodiments.

Furthermore, vibration isolating seals could be provided wherever the encasement 30 may be in contact with the support frame 23. FIG. 7 shows such a seal 37 surrounding the structural mount 32 that is intended for connecting the support frame to the structure. In this example, two parts 38 and 39 are joined to form the encasement 30, wherein the mount 32 protrudes the encasement 30 at the seam between the two parts 38 and 39. The seam however does not have to necessarily run through the hole for the mount 32—different seam locations may be provided.

Figure 8:
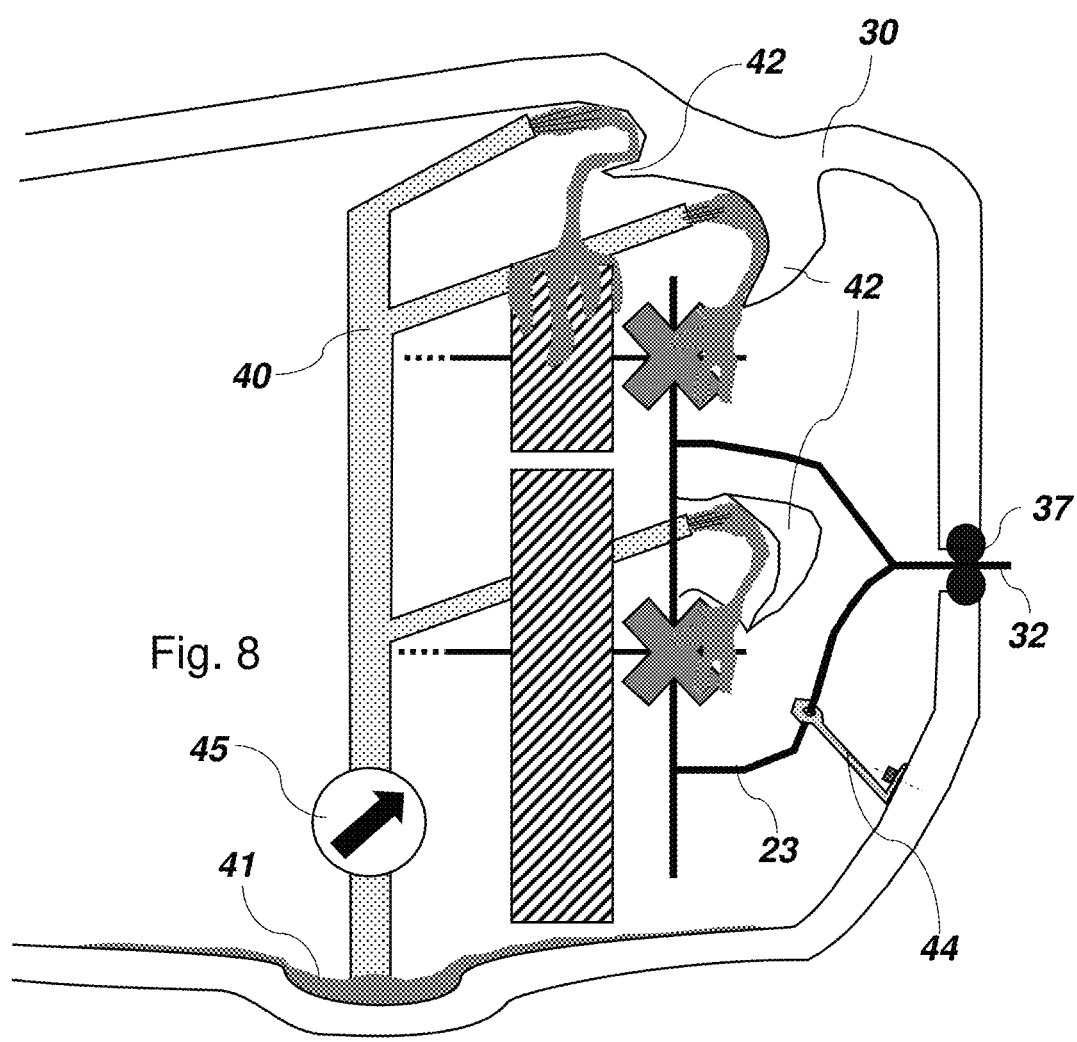

FIG. 8 shows an embodiment of the transmission further comprising a lubricant distribution system 40 for distributing lubricant 41 inside the encasement 30. Lubricant guiding elements 42 are arranged on the encasement 30 to guide the lubricant towards the gears and/or either side of the bearings, including the outer side, which would normally, i.e. in a transmission housing according to the state of the art, not be reached by lubricant as they would face the outside of the housing.

In the shown example, the lubricant guiding elements 42 are incorporated in, e.g. machined, cast or mounted into, the interior of the encasement 30. The lubricant distribution system may consist of a channel array 40 with a pump 45 that lets the lubricant 41 circulate within the encasement 30. Instead of providing lubricant guiding elements 42, the channels or pipes may alternatively be curved to reach the respective target places for the lubricant. In any case, the lubricant distribution system 40 may in particular be configured to (evenly) spread the lubricant 41 over the target places, which may imply the use of nozzles, sprinklers, or the like. FIG. 8 shows the support frame 23 in a highly abstracted way. The mount 32 diverting from a main body of the support frame exits the encasement 30 so that the fixing points 32 can be affixed to the structure of a machine. It is further noted that only part of the shafts, support frame, and gears is shown in FIG. 8.

Another embodiment with a lubricant distribution system merely comprises lubricant guiding elements (such as the elements 42 in FIG. 8). In this case the lubricant may be distributed simply by splashing. i.e. the lubricant settles to the bottom of the encasement and then the gears turn around and fling the lubricant around to be captured and fed onto the gears and bearings. This is referred to as splash lubrication or wet sump, whereas the embodiment of FIG. 8 is referred to as a fed lubrication or dry sump. Even with splash lubrication there may still be features such as guide elements 42 that correspondingly control the flow of the lubricant to the desired gears and bearings.

In general, the encasement 30 may be made of a non-metal material, either fully or at least for the most part. For example, an encasement 30 made of (fibre-reinforced) plastic has the advantages of weight reduction and increased vibration abatement.

In some embodiments, which are not shown in the figures, the encasement is configured to encapsulate the whole support frame and to further encapsulate a portion of the structure, namely the part of the structure connected to the fixing points 32. In this example, support frame 23 needs to be mounted onto the structure first, before the encasement 30 can be mounted. This allows for providing lubricant at the locations where the support frame 23 is mounted to the structure as well, so that in some embodiments, the lubricant distribution system 40 is configured to distribute lubricant to the fixing points 32. Alternatively or additionally, the encasement 30 could further surround the motor 33 and/or the mounting places 32/35. And advantage of such an embodiment would be the supply of lubricant further to the motor and/or the mounting places.

If the motor is included in the encasement, the motor may have its own structural frame or may also be embodied without any encapsulation as this function is then also provided by the overall encasement.

In some embodiments, as can be seen in FIG. 8, the transmission further comprises a locating element 44 arranged between the encasement and the support frame. This can increase the support of the encasement 30. The locating element 44 does not sit in the load path between the gears and the structure. It is designed to take no load except for the weight of the encasement 30. The locating element 44 may be made of or contain material that dampens vibration, e.g. rubber.

As the disclosure allows much more possibilities/freedom to design the encasement, in some embodiments, which are not shown in the figures, the transmission further comprises an air ventilation system with an air inlet, an air outlet, and an air accelerator, wherein the air inlet and the air outlet are arranged on the encasement. The air inlet and the air outlet are located at spots where no lubricant impends to leave the encasement. In particular, at the location where the air inlet and/or air outlet are placed, the encasement could have protection shields that hinder the lubricant to come near the inlet/outlet. An air accelerator could be embodied as a fan or impeller. The air ventilation system would further improve the transmission as it would effectively dissipate heat generated in the transmission.

FIG. 9 shows a support frame 23 in accordance with an embodiment with motor 33 attached by bolted joints 34. In this example, the support frame 23 is made of two main pieces that are connected at the joint spots 36. The shown system has points 35 (provided on the motor) and 32 (provided on the support frame) for being mounted to the structure of a machine. On the back side (the view is blocked in this figure), the system may have more such protruding fixing points. Axis A1 is the axis of the input shaft 24, axis A2 is the axis of the intermediary shaft, and axis A3 is the axis of the output shaft 26. For a better illustration of the support frame 23, the shafts (as well as the gears) are hidden here.

FIG. 10 shows the system from FIG. 9 with the gear train wrapped by an encapsulating encasement 30. In this example, the encasement 30 consists of two pieces connected along a seam. For assembly, the first half is put over the gear train so that the connecting points 32 are sliding in holes provided in the encasement 30, the holes equipped with rings that seal the oil and provide vibration dampening. The second half is put over the gear train so that the output shaft 26 is sliding in a hole provided in the encasement 30, the hole again equipped with a ring that seals the oil and provides vibration dampening. In particular, the encasement 30 also has sealing elements to seal between the motor 33 and the inside of the encasement 30.

Although aspects are illustrated above, partly with reference to some preferred embodiments, it must be understood that numerous modifications and combinations of different features of the embodiments can be made. All of these modifications lie within the scope of the appended claims.

The invention claimed is:

1. An encapsulated gear train for a machine comprising:
a support frame, which is non-encasing,
an input shaft rotatably mounted in the support frame,
an output shaft rotatably mounted in the support frame,
gears configured to operatively connect the input shaft with the output shaft, and
an encasement configured to encapsulate the input shaft, the output shaft, the gears, and at least a portion of the support frame,
wherein:
the support frame is configured to be mounted on a structure of the machine such that the support frame does not apply any loads onto the encasement,
the support frame comprises a fixing point protruding from a main body of the support frame, and the support frame is configured to be mounted on the structure by the fixing point,
the encasement is configured to encompass the fixing point and to seal the encapsulated components, and
a vibration isolating seal is arranged between the encasement and fixing point, such that the vibration isolating seal prevents a direct contact between the encasement and the fixing point.

2. The encapsulated gear train according to claim 1, wherein the encasement is, in terms of substance, separate item from the support frame.

3. The encapsulated gear train according to claim 1, wherein the encasement is, at least for the most part, made of a non-metal material.

4. The encapsulated gear train according to claim 1, comprising a lubricant distribution system configured to distribute lubricant inside the encasement.

5. The encapsulated gear train according to claim 4, wherein at least one of:
an interior of the encasement,
the support frame, and
a lubricant guiding element arranged on the encasement or the support frame is part of the lubricant distribution system and configured to guide the lubricant towards at least one of:
the gears, and
bearings,
the gears and bearings being mounted on the input shaft or the output shaft which are rotatably mounted in the support frame.

6. An electric powertrain comprising an encapsulated gear train according to claim 5, and an electric motor, wherein the encasement is configured to further encapsulate the electric motor.

7. The encapsulated gear train according to claim 1, wherein the support frame is produced by at least one of casting, sintering, forging, machining, moulding, or additive manufacturing.

8. The encapsulated gear train according to claim 7, wherein the support frame is designed to have optimized strength and/or stability.

9. The encapsulated gear train according to claim 1, comprising a locating element arranged between the encasement and the support frame.

10. The encapsulated gear train according to claim 1, comprising an air ventilation system with an air inlet, an air outlet, and an air accelerator, wherein the air inlet and the air outlet are arranged on the encasement.

11. The encapsulated gear train according to claim 1, wherein the machine is an electric vehicle and the encapsulated gear train is a single-speed two-stage transmission.

12. An electric powertrain comprising an encapsulated gear train according to claim 11, and an electric motor, wherein the encasement is configured to further encapsulate the electric motor.

13. An electric powertrain comprising an encapsulated gear train according to claim 1, and an electric motor, wherein the encasement is configured to further encapsulate the electric motor.

14. An encapsulated gear train for a machine comprising:
a support frame, which is non-encasing,
an input shaft rotatably mounted in the support frame,
an output shaft rotatably mounted in the support frame,
gears configured to operatively connect the input shaft with the output shaft,
an encasement configured to encapsulate the input shaft, the output shaft, the gears, and at least a portion of the support frame, and
a locating element arranged between the encasement and the support frame for increasing the support of the encasement, wherein the locating element is designed to take no load except for the weight of the encasement,
wherein the support frame is configured to be mounted on a structure of the machine such that the support frame does not apply any loads onto the encasement.

15. The encapsulated gear train according to claim 14, wherein the locating element does not sit in the load path between the gears and the structure.

16. The encapsulated gear train according to claim 15, wherein
the support frame comprises a fixing point protruding from a main body of the support frame, and the support frame is configured to be mounted on the structure by the fixing point, and
the locating element is spaced away from the fixing point.

17. The encapsulated gear train according to claim 14, wherein the locating element is made of or contains elastic material that dampens vibration.

* * * * *